M. G. CAMPBELL.
ANTIFRICTION THRUST BEARING.
APPLICATION FILED FEB. 1, 1919.

1,399,190.

Patented Dec. 6, 1921.

Inventor
Malcolm G. Campbell

By Whittemore Hulbert & Whittemore
Attorneys

UNITED STATES PATENT OFFICE.

MALCOLM G. CAMPBELL, OF WINDSOR, ONTARIO, CANADA, ASSIGNOR TO KELSEY WHEEL COMPANY, INC., OF DETROIT, MICHIGAN, A CORPORATION OF NEW YORK.

ANTIFRICTION THRUST-BEARING.

1,399,190. Specification of Letters Patent. Patented Dec. 6, 1921.

Application filed February 1, 1919. Serial No. 274,423.

*To all whom it may concern:*

Be it known that I, MALCOLM G. CAMPBELL, a subject of the King of Great Britain and Ireland, residing at Windsor, in the Province of Ontario and Dominion of Canada, have invented certain new and useful Improvements in Antifriction Thrust-Bearings, of which the following is a specification, reference being had therein to the accompanying drawings.

The invention relates to thrust bearings of that type in which a series of balls are arranged between parallel annular race members having complementary grooves in their adjacent parallel faces for receiving the balls.

It is the object of the invention to obtain a unit construction in which all of the co-operating members of the bearing are retained in assembled relation and which, nevertheless, provides for quickly detaching and attaching said members. To this end the invention comprises the construction as hereinafter set forth.

Figure 2:
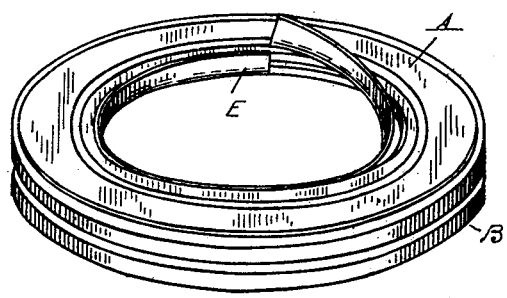
Fig. 2 is a perspective view showing the manner of interlocking the bearing members.
Figure 1:
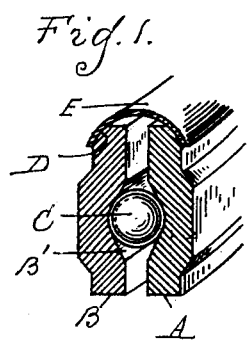
Figure 1 is a cross-section through the bearing.
Figure 3:
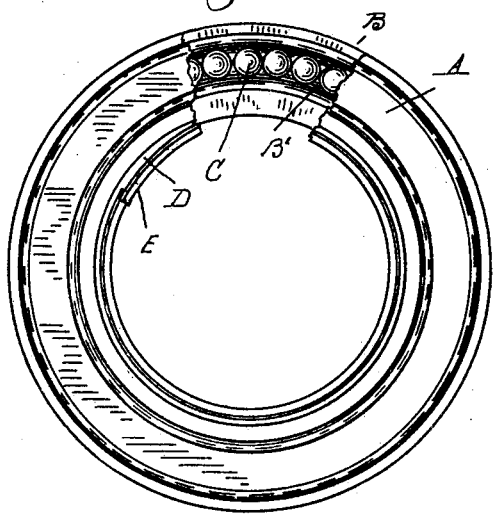
Fig. 3 is a sectional elevation of the assembled bearing.

A and B are substantially parallel ring members having formed in their adjacent faces the grooves B' for receiving a series of balls C. The inner edges of the ring members are preferably beveled, as indicated at D, and E is the grooved retainer ring for engaging said beveled edges to hold the race members together upon opposite sides of the balls. To permit of quickly engaging and disengaging the ring E it is split at one point and is formed of flexible and slightly resilient sheet metal. Thus, as shown in Figs. 2 and 3, when the ring members A and B are assembled in relation to each other the ring E may be sprung into engagement therewith by overlapping its ends. This will contract the diameter sufficiently to permit of insertion within the rings A and B, and upon expansion the portions upon opposite sides of the groove will engage with the bevel faces D to lock the members A and B to each other. My improvement dispenses with the necessity of providing a retainer or cage for the balls, as the latter may be placed directly in the groove of one of the members A and B and after placing on the complementary member A the split ring E is engaged to retain these members from displacement. Thus the construction is very simple and inexpensive.

What I claim as my invention is:

1. A thrust bearing, comprising parallelly arranged race members having complementary annular grooves in their adjacent faces, the inner edges of said race members being beveled, a series of balls arranged in the grooves between said race members, and a split ring of resilient material having a groove formed along its entire outer face and adapted to be sprung into engagement with said race members so as to embrace the entire length of the beveled inner edges thereof.

2. A thrust bearing comprising parallelly arranged race members having complementary annular grooves in their adjacent faces, the inner edges of said race members being beveled, a series of balls arranged in the grooves between said race members and a split ring of resilient material having an arc-shaped groove formed along its outer face and adapted to be sprung into engagement with said race members so as to embrace the beveled inner edges thereof.

In testimony whereof I affix my signature.

MALCOLM G. CAMPBELL.